(12) United States Patent
Hansen

(10) Patent No.: US 7,484,919 B2
(45) Date of Patent: Feb. 3, 2009

(54) FASTENER ASSEMBLY

(75) Inventor: Wayne M. Hansen, Poynette, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 11/581,555

(22) Filed: Oct. 16, 2006

(65) Prior Publication Data

US 2007/0172327 A1   Jul. 26, 2007

Related U.S. Application Data

(60) Provisional application No. 60/761,707, filed on Jan. 24, 2006.

(51) Int. Cl.
  *F16B 13/06* (2006.01)
  *F16B 19/00* (2006.01)
(52) U.S. Cl. .......................................... 411/45; 411/41
(58) Field of Classification Search .................... 411/41, 411/45–48, 508, 32, 33
  See application file for complete search history.

(56) References Cited

U.S. PATENT DOCUMENTS

| | | | | |
|---|---|---|---|---|
| 3,319,918 A | * | 5/1967 | Rapata | 248/239 |
| 3,745,612 A | * | 7/1973 | Seckerson | 411/509 |
| 4,114,509 A | * | 9/1978 | Poe | 411/80.2 |
| 4,786,225 A | * | 11/1988 | Poe et al. | 411/32 |
| 4,830,556 A | * | 5/1989 | Nelson | 411/41 |
| 4,927,287 A | * | 5/1990 | Ohkawa et al. | 403/408.1 |
| 4,970,761 A | * | 11/1990 | Nakamura | 24/453 |
| 5,163,795 A | * | 11/1992 | Benoit et al. | 411/45 |
| 5,632,581 A | * | 5/1997 | Hasada | 411/48 |
| 5,775,860 A | * | 7/1998 | Meyer | 411/46 |
| 6,769,849 B2 | * | 8/2004 | Yoneoka | 411/45 |
| 7,105,119 B2 | * | 9/2006 | Kanie et al. | 264/238 |
| 2005/0019130 A1 | | 1/2005 | Kanie et al. | |

* cited by examiner

*Primary Examiner*—Flemming Saether
(74) *Attorney, Agent, or Firm*—Mark W. Croll; Paul F. Donovan

(57) ABSTRACT

Embodiments of the present invention provide a fastener assembly that includes a grommet and a pin. The grommet may include a collar integrally formed with a plurality of legs, wherein an opening is formed through the collar. The pin is moveable through the opening between pre-driven and driven positions. The pin may include a plurality of flexible pin compression members connected to a ramp. The plurality of flexible pin compression members and the ramp spread the legs open in the driven position.

20 Claims, 6 Drawing Sheets

FASTENER ASSEMBLY

RELATED APPLICATIONS

This application relates to and claims priority benefits from U.S. Provisional Patent Application No. 60/761,707 entitled "Fastener Assembly," filed Jan. 24, 2006, which is hereby incorporated by reference in its entirety.

FIELD OF THE INVENTION

Embodiments of the present invention generally relate to a fastener assembly, and more particularly to a plastic fastening rivet assembly.

BACKGROUND OF THE INVENTION

Expansion rivet assemblies are used in various applications, and are particularly well-suited for blind fastening applications commonly found in automobiles. Conventional expansion rivet assemblies include a pin configured to securely engage a grommet or other such body. The pin and body may be molded as two pieces and assembled, or molded as a single piece with a flash joint between the two pieces and driven together in a separate assembly process.

Typically, the pin is driven into the body, which includes ramps on the inside or outside of integrally formed retention legs. The ramps are configured to force the legs to outwardly move or swing when the pin is driven into the body. The solid pin compresses the body legs against a retaining edge of a primary panel.

FIG. 1 illustrates an isometric view of a conventional fastener assembly 10. The fastener assembly 10 includes a pin 12 that is positioned within a body 14. The pin 12 includes a shaft 16 that has a substantially constant axial cross section. For example, the shaft 16 may be cylindrical.

As the pin 12 is driven through a central opening (not shown) formed through the body 14, the shaft encounters ramps (not shown) operatively connected to legs 18 of the body 14. As the pin 12 continues to pass through the body 12 between the legs 18, the shaft 16 engages the ramps, which in turn forces the legs 18 outward. The spreading legs 18 create a fairly robust joint with respect to a panel positioned between the legs 18 and an underside of a collar 20 of the body 14.

Depending on the requirements of the application and joint assembly, a large amount of force may be needed to push the pin 12 into the body 14. The amount of force used to drive the pin into the body depends on the amount of plastic being crushed as the pin 12 and legs 18 interfere with the hole (not shown) in the panel (not shown). If panel separation occurs, the fastener assembly 10 cannot adapt to reform a robust joint. Thus, the joint secured by the fastener assembly 10 may be irreversibly loosened.

Conventional expansion rivet assemblies are not resilient. As such, conventional expansion rivet assemblies may not be able to maintain a robust, tight joint throughout service life. Additionally, in some applications, the force used to drive the pin into the body is so high that a mallet is used to seat the pin to its fully-driven position with respect to the body.

Other types of expansion rivet assemblies include a cored out pin, which acts as a flexible member. Similar to the conventional expansion rivet assemblies explained above, however, these types of assemblies use the pin to drive ramps in order to move the legs of the body outward. Further, the cored out pin may still be difficult to seat with respect to the body.

Thus, a need exists for a fastener assembly that retains a robust, tight joint throughout service life. Additionally, a need exists for a fastener assembly that may be easily secured into a fully-driven position.

SUMMARY OF THE INVENTION

Certain embodiments of the present invention provide a fastener assembly that includes a grommet, or a pin-retaining body, and a pin. The grommet may include a collar integrally formed with a plurality of legs, wherein an opening is formed through the collar. The pin is moveable through the opening between pre-driven and driven positions. The pin may include a plurality of flexible pin compression members connected to a ramp. The plurality of flexible pin compression members and the ramp spread the legs open in the driven position.

The fastener assembly may also include a central shank connected to the flexible pin compression members. The grommet may include at least one notch that slidably retains the central shank in order to prevent the pin from rotating with respect to the grommet.

Each flexible pin compression member may include a leg-engaging wall connected to the central shank through a spring-biased joining wall. The leg-engaging wall is configured to flex with respect to the central shank when force is exerted on the leg-engaging wall.

The pin compression members inwardly flex during movement between the pre-driven and driven positions. The flexing of the pin compression members facilitates movement between the pre-driven and driven positions. That is, the flexing of the pin compression members allows the pin to be easily moved into the grommet. Further, the pin compression members ensure that the legs remain spread open in the driven position.

Each of the legs may include an inwardly angled distal wall. The ramp engages the inwardly angled distal walls in the driven position and spreads the inwardly angled distal walls apart from one another.

Certain embodiments of the present invention also provide a pin configured to be secured to a grommet having a plurality of legs, such that the pin and the grommet form an expansion rivet assembly. The pin may include a pin head, a central shank integrally connected to the pin head, a plurality of flexible pin compression members connected to the central shank, a circumferential ramp connected to the plurality of flexible pin compression members and the central shank, a recessed shaft connected to the circumferential ramp, and a distal tip having a ramped nose integrally connected to a ledge, wherein the recessed shaft joins to the ledge. The pin is configured to move through the grommet into a driven position in which the plurality of flexible pin compression members and the ramp spread the legs open.

Figure 1:
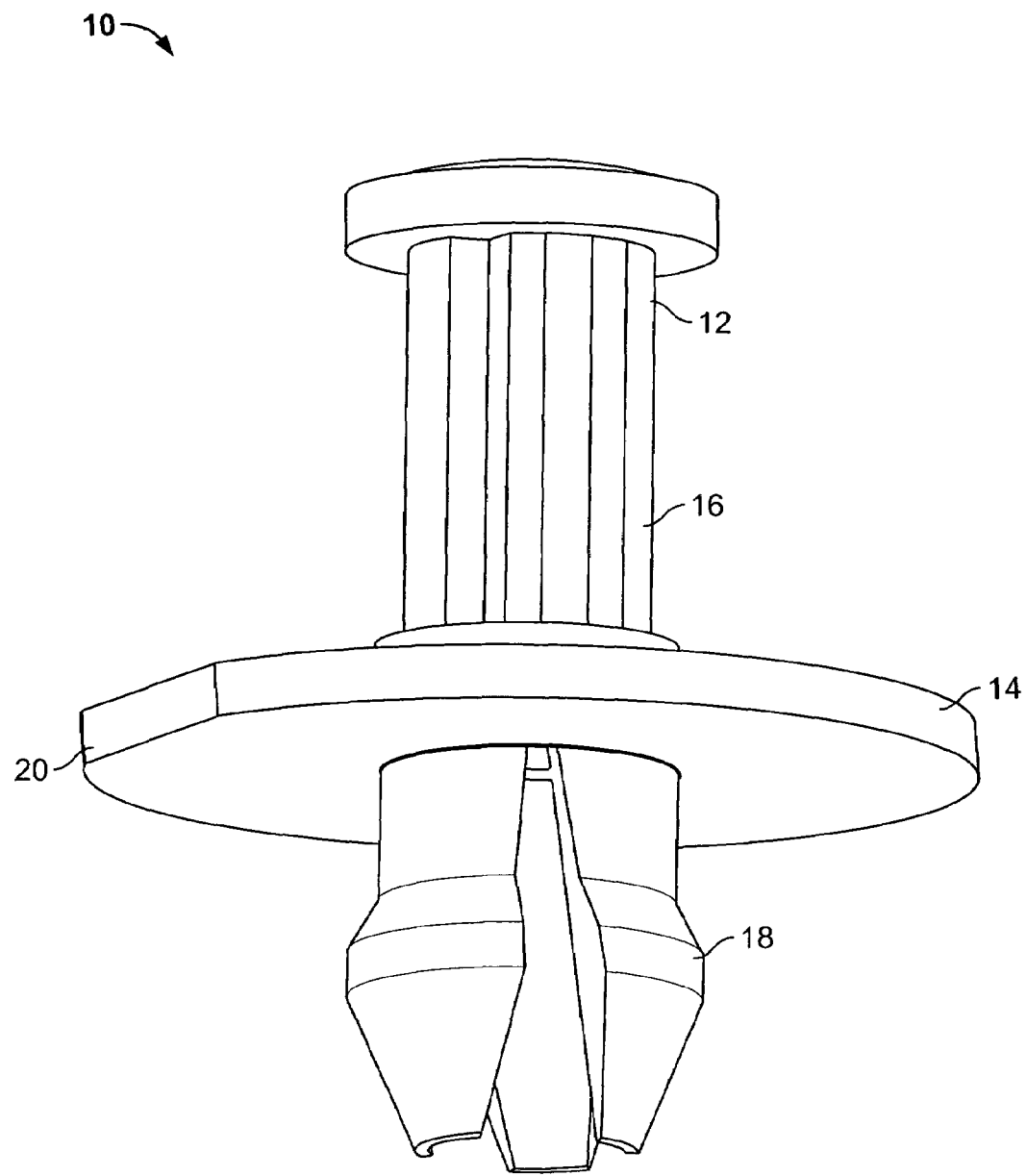
FIG. 1 illustrates an isometric view of a conventional fastener assembly.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE INVENTION

Figure 2:
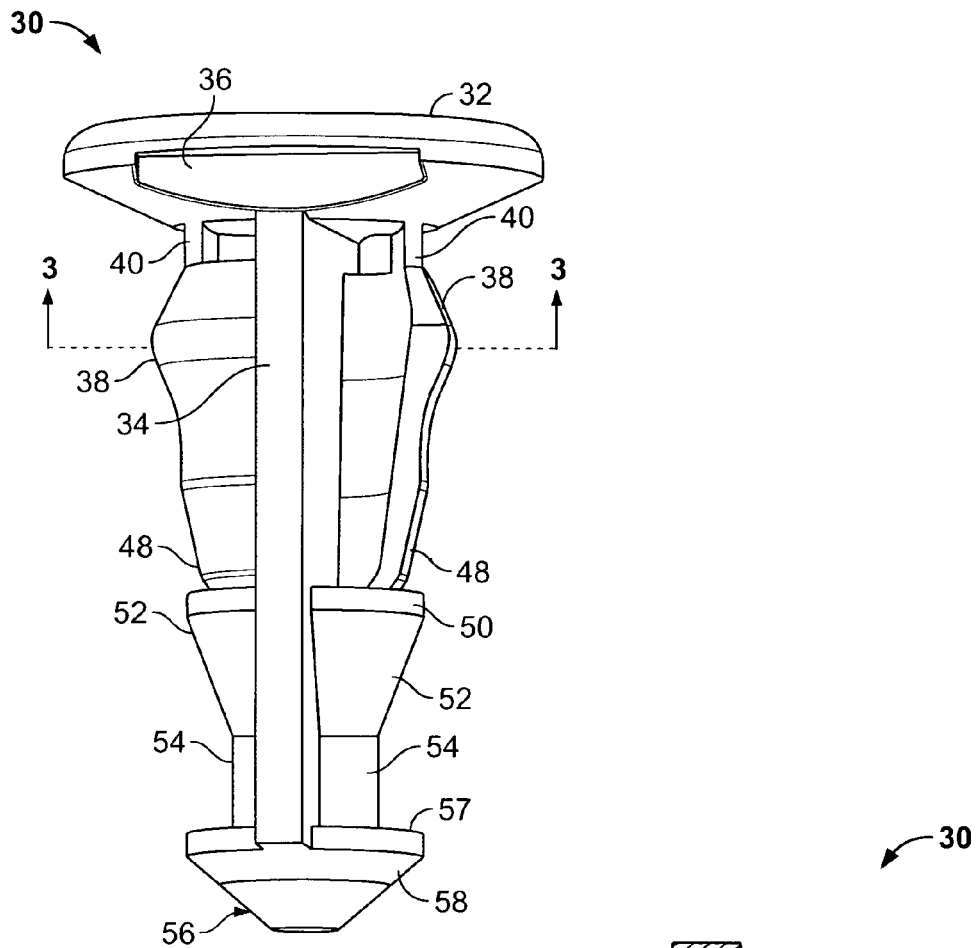
FIG. 2 illustrates an isometric view of a pin according to an embodiment of the present invention.

FIG. 2 illustrates an isometric view of a pin 30 according to an embodiment of the present invention. The pin 30 includes a pin head 32 integrally connected to a central shank 34 that downwardly extends from the pin head 32. The pin head 32 may include a notch or cavity 36 configured to receive a tool, such as an operative end of a flat head screwdriver. A user may engage the pin 30 with the tool when the pin 30 is in a fully-driven position with respect to a body or grommet (not shown in FIG. 2), in order to remove the pin 30 from the fully-driven position. For example, the tool may be used to pry the pin head 32 away from the body or grommet.

Pin compression members 38 are integrally connected to the central shank 34. Additionally, the pin compression members 38 may be connected to an underside of the pin head 32 through integrally formed beams 40 that extend downwardly from the pin head 32. Alternatively, one or both pin compression members 38 may be separated from the pin head 32. The pin compression members 38 radially extend past the beams 40. That is, the pin compression members 38 outwardly bulge from the central shank 34.

Figure 3:
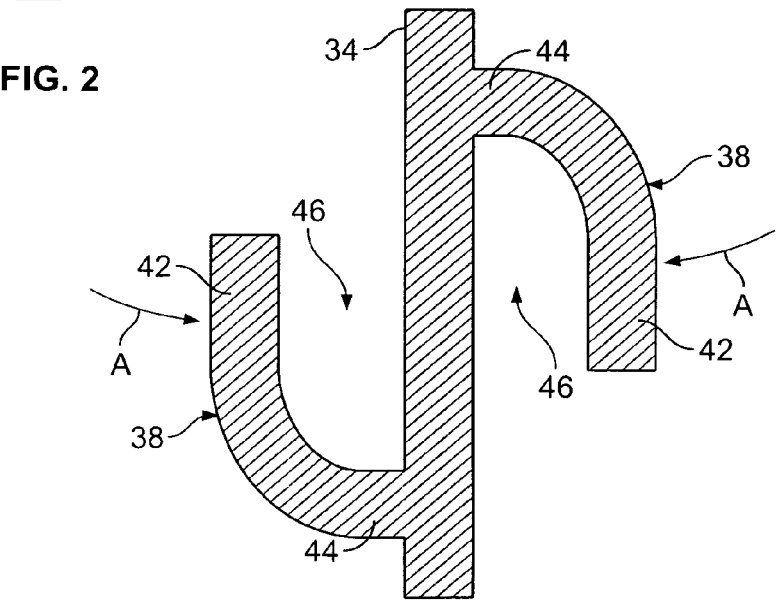
FIG. 3 illustrates an axial cross-sectional view of a pin through line 3-3 of FIG. 2 according to an embodiment of the present invention.

FIG. 3 illustrates an axial cross-sectional view of the pin 30 through line 3-3 of FIG. 2. As shown in FIG. 3, the pin compression members 38 include a body-engaging wall 42 integrally connected to the central shank 34 through a curved, resilient, spring-biased joining wall 44. Each pin compression member 38 connects to the central shank 34 through respective joining walls 44, while each body-engaging beam 42 is separated from the central shank by a gap 46. As shown in FIG. 3, one pin compression member 38 may connect to the central shank 34 through a joining wall 44 proximate one edge of the central shank 34, while the other pin compression member 38 may connect to the central shank 34 through a joining wall 44 proximate an opposite edge of the central shank 34. The resilient, spring-biased joining walls 44 allow the pin compression members to flex inwardly in the direction of arrows A when an inwardly-directed force is applied to the body-engaging beams 42.

Referring again to FIG. 2, the diameter of each pin compression member 38 decreases toward the distal end of the pin 30. The pin compression members 38 are closer to the central shank 34 toward the lower portion of the pin 30 than at an upper portion of the pin 30.

Lower portions 48 of the pin compression members 38 integrally connect to a ledge 50 proximate a mid-section of the pin 30. The ledge 50, in turn, is integrally connected to ramps 52. The ramps 52 may be separate structures located around a central shaft, or the ramps 52 may be a single circumferential ramp positioned about a central vertical axis of the pin 30. The ramps 52 angle down toward the distal end of the pin 30 and are integrally connected to a recessed shaft 54. The recessed shaft 54 is, in turn, integrally connected to a distal tip 56. The distal tip 56 includes a ledge 57 integrally connected to ramped surfaces 58 that angle toward one another.

Figure 4:
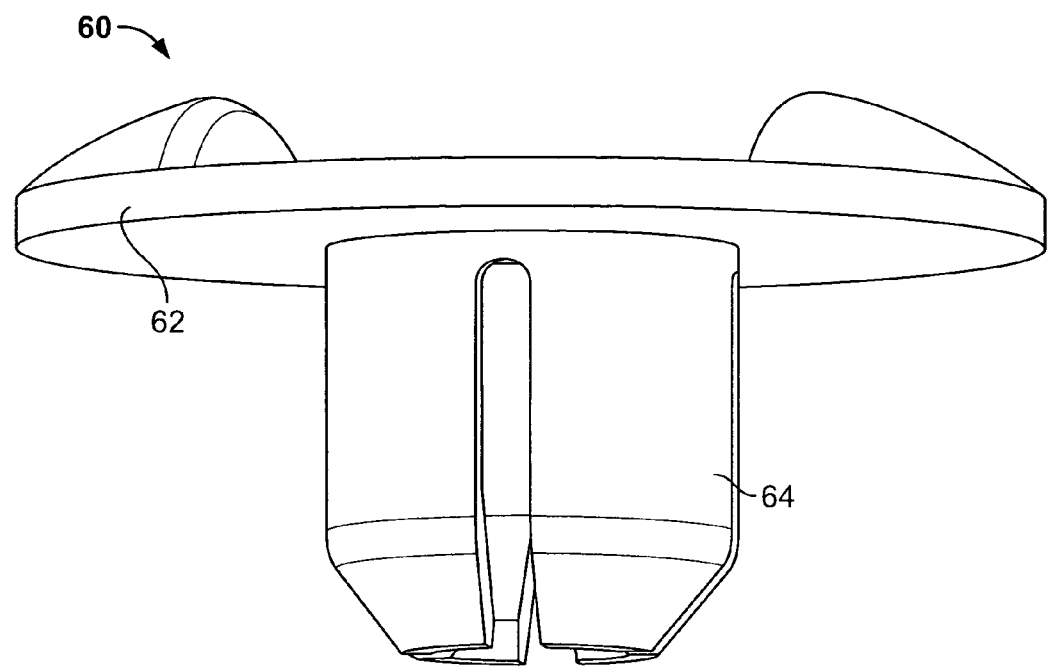
FIG. 4 illustrates an isometric view of a pin-receiving body according to an embodiment of the present invention.

FIG. 4 illustrates an isometric view of a pin-receiving body or grommet 60 according to an embodiment of the present invention. The pin-receiving body 60 includes a collar 62 integrally connected to legs 64 extending downwardly from the collar 62. The body 60 may include any number of legs 64. For example, the body 60 may include three of four legs.

The collar 62 includes a central opening (not shown) configured to allow the pin 30 (shown in FIGS. 2-3) to pass therethrough and between the legs 64. Additionally, notches (not shown) are formed through the collar 62 in the opening. The notches are configured to slidably receive the central shank 34 (shown in FIGS. 2-3) in order to properly align the pin 30 with respect to the body 60, and prevent the pin 30 from rotating with respect to the body 60.

Figure 5:
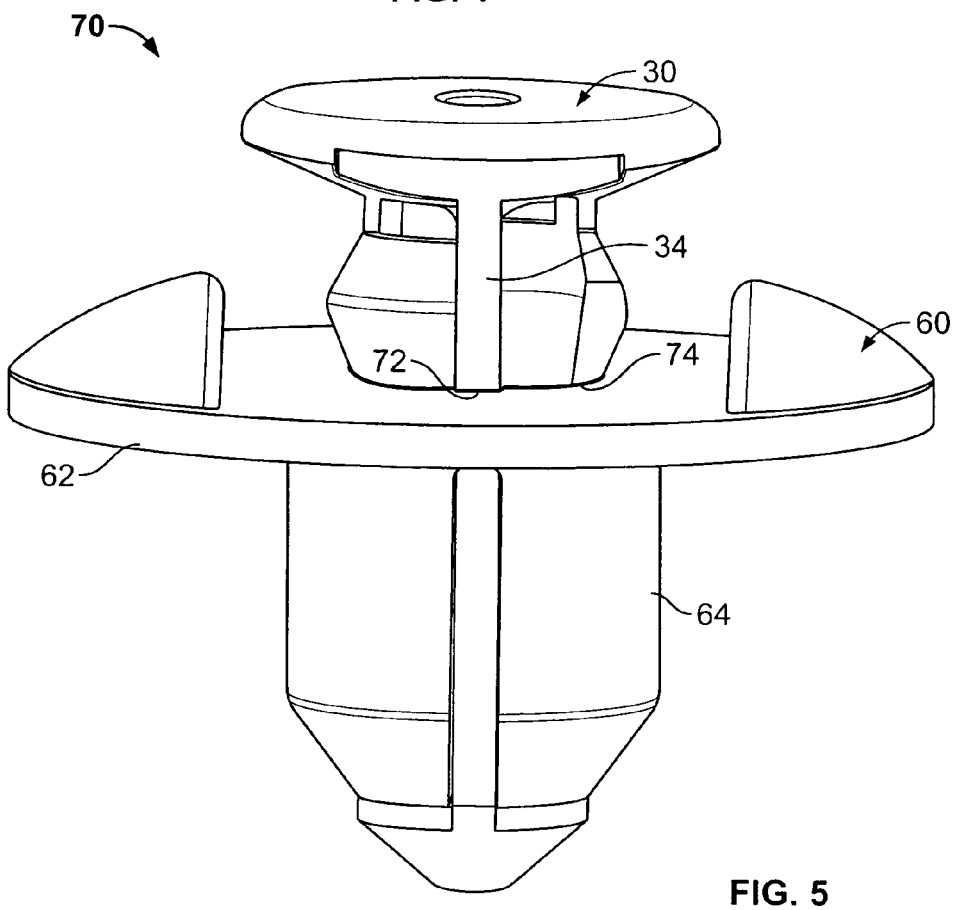
FIG. 5 illustrates an isometric view of a fastener assembly in a pre-driven stage according to an embodiment of the present invention.

FIG. 5 illustrates an isometric view of a fastener assembly 70 in a pre-driven stage. The fastener assembly 70 includes the pin 30 and the body 60. The fastener assembly 70 may be formed and manufactured as a single piece, with a flash connection between the pin 30 and the body 60. Alternatively, the pin 30 and the body 60 may be separately manufactured.

As shown in FIG. 5, the central shank 34 of the pin 30 is positioned within notches 72 of the opening 74 formed through the collar 62 of the body 60. The pin 30 is prevented from spinning or rotating within the body 60 because the notches retain the central shank 34 of the pin 30.

Figure 6:
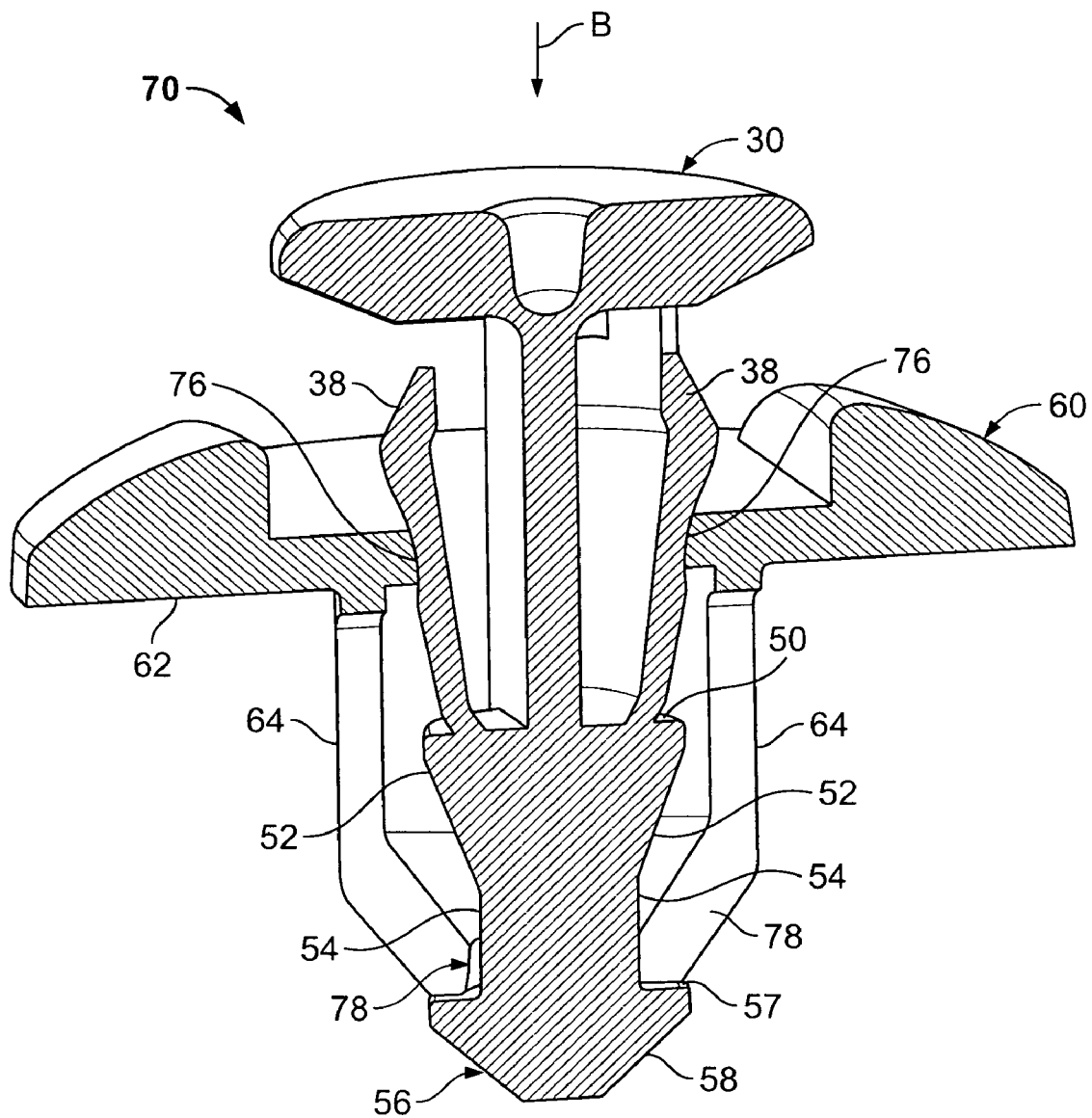
FIG. 6 illustrates a lateral cross-sectional view of a fastener assembly in a pre-driven stage according to an embodiment of the present invention.

FIG. 6 illustrates a lateral cross-sectional view of the fastener assembly 70 in a pre-driven stage. The fastener assembly 70 may be shipped to a customer in the pre-driven stage. As the pin 30 is urged into the body 60 in the direction of arrow B, the pin compression members 38 engage interior edges 76 of the collar 62. The pin 30 is moved into the body 60 such that the distal tip 56 engages inwardly angled distal walls 78 of the legs 64. The ramped surfaces 58 of the distal tip 56 force the walls 78 open as the pin 30 continues to move in the direction of arrow B. Once the walls 78 engage the ledge 57 of the distal tip, the walls 78 (and legs 64) snap back to their at-rest positions. Thus, the inwardly angled distal walls 78 of the legs 64 are positioned around the recessed shaft 54. At this stage, the walls 78 retain the recessed shaft 54 in place, but may or may not interfere with the recessed shaft 54.

Figure 7:
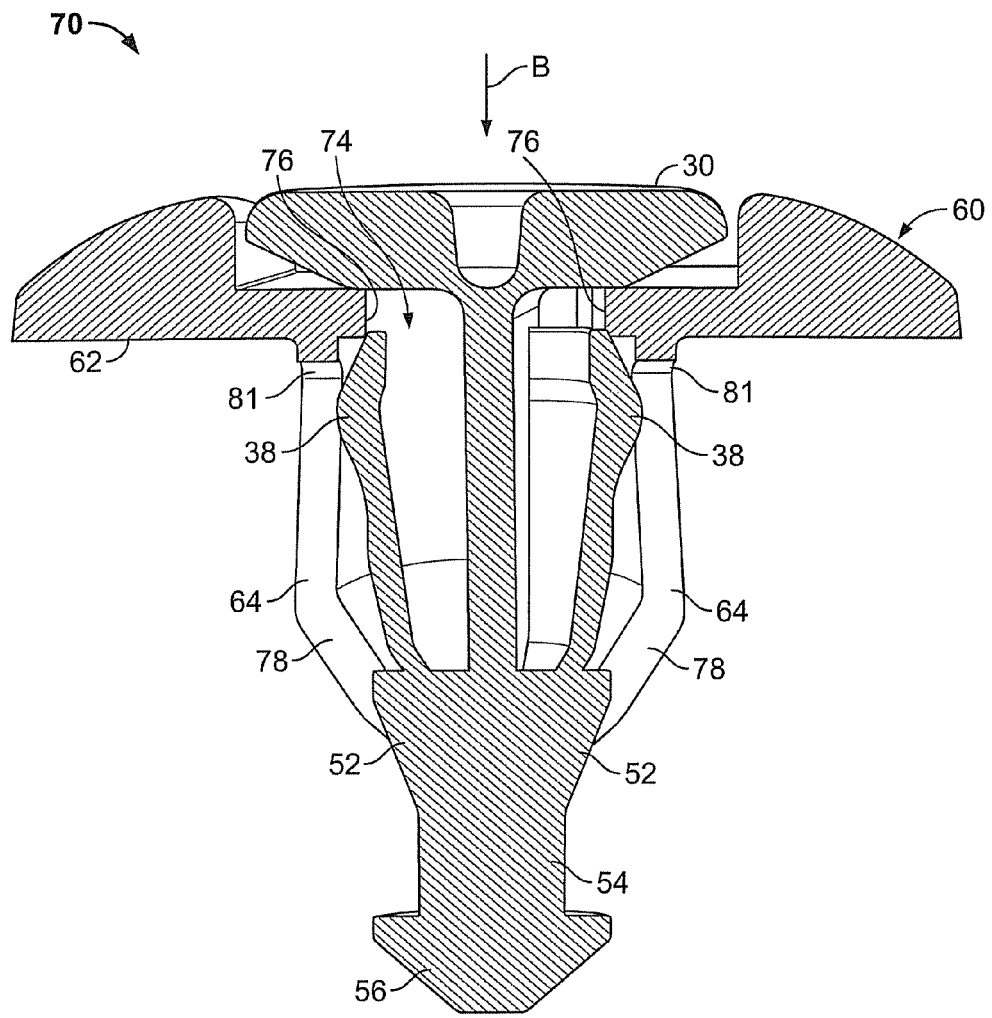
FIG. 7 illustrates a lateral cross-sectional view of a fastener assembly in a fully-driven stage according to an embodiment of the present invention.

FIG. 7 illustrates a lateral cross-sectional view of the fastener assembly 70 in a fully-driven stage. Referring to FIGS. 6 and 7, as the pin 30 continues to be urged in the direction of arrow B, the interior edges 76 of the collar 62 squeeze the pin compression members 38 towards one another. Referring to FIG. 3, the body engaging walls 42 of the pin compression members 38 inwardly curl in the direction of arrows A. Referring again to FIGS. 6 and 7, during this movement, energy is stored in the resilient pin compression members 38, as the pin compression members 38 resist the inwardly-curling movement. The stored energy within the pin compression members 38 urges the pin compression members 38 outward and downward, thereby assisting in moving the pin 30 in the direction of arrow B, toward the fully-driven position.

At the same time, the pin 30 is moved through the body 60 such that the recessed shaft 54 and the distal tip 56 extend past the legs 64. Simultaneously, the ramped surfaces 52 of the pin 30 engage the angled distal walls 78 of the legs 64, thereby spreading the legs 64 open. Once the pin compression members 38 move through the central opening 74 of the body 60 past the interior edges 76, the force stored in the pin compression members 38 snaps the pin compression members 38 back to their at-rest positions. Thus, the pin compression members 38 also exert a force into upper portions 81 of the legs 64, further spreading the legs 64 open. In the fully-driven position, the pin head 32 fully seats against the collar 62. As such, the collar 62 acts as a positive stop during the insertion process.

As discussed above, the pin 30 forces the legs 64 open through the ramped surfaces 52 spreading the distal walls 78 of the legs 64 open and the pin compression members 38 springing back into upper portions 81 of the legs 64. As such, the fastener assembly 70 may provide a robust connection between panels. Additionally, because the pin compression members 38 are spring-biased and resilient, if the fastener assembly 70 is shifted (such as through shifting panels) such that the pin 30 retreats within the body 60, the resilient spring members 38 are compressed toward one another. As the pin compression members 38 move toward one another, energy is stored within the pin compression members 38. The energy is released by the pin compression members 38 thereby expanding the pin compression members 38 to their at-rest positions. The angled nature of the pin compression members 38 (i.e., the decreasing diameter toward the distal tip 56) ensures that the pin 30 is forced downward in the direction of arrow B when the pin compression members 38 are compressed to their maximum amount. Thus, the pin 30 adapts to changing positions by way of the pin compression members 38 springing back to their original positions. Energy stored in the pin compression members 38 forces the pin compression members 38 back to their at-rest positions, thereby forcing the pin 30 downward in the direction of arrow B. As such, the ramped surfaces 52 and the pin compression members 38 spread the legs 64 open, as discussed above. Therefore, the fastener assembly 70 provides an adaptable, self-correcting robust connection.

Figure 8:
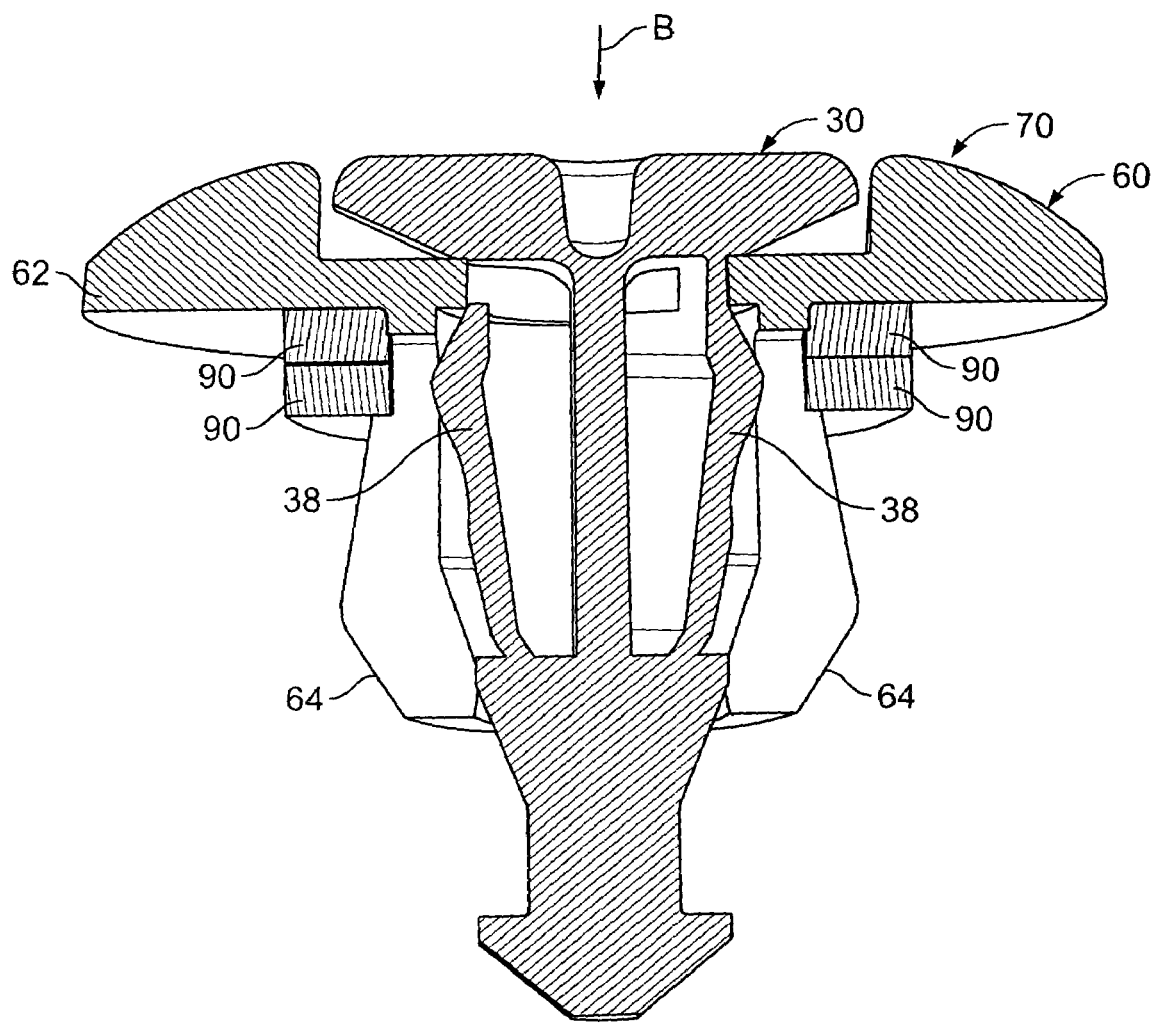
FIG. 8 illustrates a lateral cross-sectional view of a fastener assembly securing a plurality of panels together according to an embodiment of the present invention.

FIG. 8 illustrates a lateral cross-sectional view of the fastener assembly 70 securing a one or more panels 90 together according to an embodiment of the present invention. If the panels 90 shift, the pin 30 may retreat within the body 60. However, as discussed above, when the pin 30 retreats within the body 60, the spring-biased pin retention members 38 are compressed, but the energy stored within the pin compression members 38 forces the pin compression members 38 back to their original positions. Thus, the pin 30 is moved back down within the body 60 in the direction of arrow B, thereby spreading the legs 64 open to compressively sandwich edges of the panels 60 between the legs 64 and the collar 62. The pin compression members 38 and the ramped surfaces 52 of the pin 30 spread the legs 64 open, thereby causing interference or engagement between the panel(s) 90 and the legs 64. In this condition, the pin 30 is under some compression inside the body 60 because the panel(s) 90 prevent the legs 64 from rotating outward. In this way, the fastener assembly 70 ensures that the panels 90 are tightly and robustly connected together.

The pin compression members 38 help pull the pin 30 to its fully driven or seated position. Additionally, the pin compression members 38, along with the ramped surfaces 52, act to spread the legs 64 open in order to compressively sandwich the panel(s) 90.

A tool may be used to remove the pin 30 from the fully-driven position. Referring to FIGS. 1 and 8, an operative end of a tool may be positioned within the cavity 36 of the pin head 32. A user may pry the pin head 32 away from the body 60 so that the pin 30 is in a pre-driven position. In this position, the pin 30 no longer exerts a spreading force into the legs 64. Thus, the legs 64 contract to their at-rest positions, and the fastener assembly 70 may be removed from the panels 90. The pin compression members 38 ensure that the fastener assembly 70 remains operable to provide a robust, tight joint at a later time. That is, the fastener assembly 70 may be removed and used again due, in part, to the flexible pin compression members 38.

Although FIG. 8 shows the panels 90 biting in the body legs 64, it is noted that this is for illustrative purposes only. The panels 90 may bite into the legs 64, the legs 64 may curl under the panels 90, or an interference/friction fit may be provided.

Thus, embodiments of the present invention provide a fastener assembly that retains a robust, tight joint throughout service life. Additionally, embodiments of the present invention provide a fastener assembly that may be easily secured into a fully-driven position.

Embodiments of the present invention provide a fastener assembly that provides tighter joints, lower pin insertion force, and long-term joint stability. When panels held together by embodiments of the present invention are separated slightly by forces in the application environment, the fastener assembly pushes the panels back together again, thereby reforming a tight joint.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

The invention claimed is:

1. A fastener assembly comprising:
   a grommet having a collar integrally formed with a plurality of legs, wherein an opening is formed through said collar; and
   a pin having a head connected to a distal tip through a central shank, said pin moveable through said opening between pre-driven and driven positions, said pin comprising a plurality of flexible pin compression members connected to a ramp, each of said plurality of flexible pin compression members connected to an underside of said head through a beam that is separate and distinct from said central shank, wherein said head has a surface extending radially outward from each of said beams, and said plurality of flexible pin compression members and said ramp spreading said legs open in said driven position.

2. The fastener assembly of claim 1, wherein said grommet comprises at least one notch that slidably retains said central shank in order to prevent said pin from rotating with respect to said grommet.

3. The fastener assembly of claim 2, wherein each of said plurality of flexible pin compression members includes a leg-engaging wall connected to said central shank through a spring-biased joining wall, wherein said leg-engaging wall is configured to flex with respect to said central shank when force is exerted on said leg-engaging wall.

4. The fastener assembly of claim 1, wherein said plurality of pin compression members inwardly flex during movement between said pre-driven and driven positions, and wherein the flexing of said plurality of pin compression members facilitates movement between the pre-driven and driven positions.

5. The fastener assembly of claim 1, wherein said plurality of pin compression members ensure that said legs remain spread open in said driven position.

6. The fastener assembly of claim 1, wherein each of said plurality of legs comprises an inwardly angled distal wall, wherein said ramp engages said inwardly angled distal walls in said driven position and spreads said inwardly angled distal walls apart from one another.

7. The fastener assembly of claim 1, wherein at least one panel is configured to be compressively sandwiched between said legs and said collar in said driven position.

8. The fastener assembly of claim 1, wherein said pin and said grommet are manufactured as a single piece with a flash connection between said pin and said grommet.

9. The fastener assembly of claim 1, wherein each of said plurality of flexible pin compression members has a free end with respect to said central shank.

10. A pin configured to be secured to a grommet having a plurality of legs, the pin and the grommet forming an expansion rivet assembly, the pin comprising:
   a pin head;
   central shank integrally connected to said pin head;
   a plurality of flexible pin compression members having first portions connected to said central shank and second portions connected to an underside of said pin head through beams that are separate and distinct from said central shank, wherein said pin head has a surface extending radially outward from each of said beams;
   a circumferential ramp connected to said plurality of flexible pin compression members and said central shank;
   a recessed shaft connected to said circumferential ramp; and
   a distal tip having a ramped nose integrally connected to a ledge, wherein said recessed shaft joins to said ledge,
   the pin being configured to move through the grommet into a driven position in which said plurality of flexible pin compression members and said ramp spread the legs open.

11. The pin of claim 10, wherein said central shank is configured to be slidably retained within a notch of the grommet in order to prevent said pin from rotating with respect to the grommet.

12. The pin of claim 10, wherein each of said plurality of flexible pin compression members includes a leg-engaging wall connected to said central shank through a spring-biased joining wall, wherein said leg-engaging wall is configured to flex with respect to said central shank when force is exerted on said leg-engaging wall.

13. The pin of claim 10, wherein said plurality of pin compression members inwardly flex to facilitate movement toward the driven position.

14. The pin of claim 10, wherein said plurality of pin compression members ensure that the legs of the grommet remain spread open in the driven position.

15. The pin of claim 10, wherein said pin comprises a pin head having at least one cavity configured to receive an operative end of a tool.

16. A fastener assembly comprising:
   a pin-retaining body having a collar integrally formed with a plurality of legs, wherein an opening having at least one notch is formed through said collar; and
   a pin moveable through said opening between pre-driven and driven positions, said pin comprising a pin head connected to a distal tip through a central shank, a plurality of flexible pin compression members connected to said central shank and a ramp, each of said plurality of flexible pin compression members also being connected to said pin head through a beam that is separate and distinct from said central shank, wherein said pin head has a surface extending radially outward from each of said beams, said plurality of flexible pin compression members and said ramp spreading said legs open in said driven position, said at least one notch slidably retaining said central shank in order to prevent said pin from rotating with respect to said pin-retaining body, said plurality of pin compression members inwardly flex during movement between the pre-driven and driven positions in order to facilitate movement between the pre-driven and driven positions, and said plurality of flexible pin compression members ensuring that said legs remain spread open in said driven position.

17. The fastener assembly of claim 16, wherein each of said plurality of flexible pin compression members includes a leg-engaging wall connected to said central shank through a spring-biased joining wall, wherein said leg-engaging wall is configured to flex with respect to said central shank when force is exerted on said leg-engaging wall.

18. The fastener assembly of claim 16, wherein each of said plurality of legs comprises an inwardly angled distal wall, wherein said ramp engages said inwardly angled distal walls in said driven position and spreads said inwardly angled distal walls apart from one another.

19. The fastener assembly of claim 16, wherein said pin comprises a pin head having at least one cavity configured to receive an operative end of a tool.

20. The fastener assembly of claim 16, wherein at least one panel is configured to be compressively sandwiched between said legs and said collar in said driven position.

* * * * *